United States Patent [19]

Aldrich

[11] Patent Number: 4,783,966

[45] Date of Patent: Nov. 15, 1988

[54] MULTI-STAGED INTERNAL COMBUSTION ENGINE

[76] Inventor: Clare A. Aldrich, 296 E. Gainsborough Rd., Thousand Oaks, Calif. 91360

[21] Appl. No.: 91,978

[22] Filed: Sep. 1, 1987

[51] Int. Cl.⁴ .............................................. F02G 3/00
[52] U.S. Cl. ...................................... 60/622; 60/599; 60/621
[58] Field of Search ................. 60/620, 621, 622, 623, 60/599; 123/563

[56] References Cited

U.S. PATENT DOCUMENTS

| | | | |
|---|---|---|---|
| 423,224 | 3/1890 | Drautz . | |
| 1,159,633 | 11/1915 | Wilkinson . | |
| 1,904,070 | 4/1933 | Morgan | 60/620 |
| 2,873,574 | 2/1959 | Webb . | |
| 3,098,472 | 7/1963 | Hoenick . | |
| 3,267,661 | 8/1966 | Petrie | 60/620 X |
| 3,782,337 | 1/1974 | Feller . | |
| 3,783,615 | 1/1974 | Hubers . | |
| 3,795,510 | 11/1968 | Davies et al. . | |
| 3,914,944 | 10/1975 | Schmidt et al. | 123/563 X |
| 4,115,037 | 9/1978 | Butler | 417/341 |
| 4,169,451 | 10/1979 | Niggemeyer | 123/202 |
| 4,174,683 | 11/1979 | Vivian | 123/48 C |
| 4,493,296 | 1/1985 | Williams | 123/55 AA |
| 4,539,946 | 9/1985 | Hedelin | 123/48 A |

Primary Examiner—Stephen F. Husar
Attorney, Agent, or Firm—Kelly, Bauersfeld & Lowry

[57] ABSTRACT

The positive displacement internal combustion engine has multiple stages of compression and expansion. After an initial compression, the working fluid is contained at elevated pressure and temperature. Valve controls on the initial compression can limit the thru-put of working fluid. Limiting the thru-put controls the pressure and density and as a consequence engine torque and power. A heat exchanger cools the working fluid before it enters a conventional spark ignition "combustion" cylinder. After the combustion of fuel in air in a conventional Otto or Diesel cycle the exhaust gas does further expansion in a post expansion stage. The efficiency benefits of the engine's high expansion ratio are realizable because of reductions in friction, fluid flow and heat transfer losses.

42 Claims, 5 Drawing Sheets

MULTI-STAGED INTERNAL COMBUSTION ENGINE

BACKGROUND OF THE INVENTION

The present invention relates to a positive displacement internal combustion engine with multiple stages of compression and expansion reaching very high pressures and having density control of engine torque.

It is known that increasing the expansion ratio of a reciprocating internal combustion engine extracts more energy during the expansion of the combustion gases. Therefore, the thermodynamic efficiency increases as the expansion ratio increases. For constant volume combustion, the theoretical thermal efficiency equals:

$$1 - 1/r^{(k-1)} \qquad (1)$$

where r is the expansion ratio and k is the adiabatic expansion coefficient, which for air at room temperature is 1.4.

Conventional Otto cycle engines usually have the same compression and expansion ratios, which are selected so that the fuel/air mixture is compressed to a point below which spark ignition does not cause detonation. Detonation depends on the anti-knock characteristics of the fuel and on the combustion chamber design. The ratio is usually about 7 in automobile engines using regular fuel, but the ratio can be over 10 in aircraft engines. Diesel engines also have equal compression and expansion ratios, but the air is compressed to a point where the injection of fuel causes ignition.

Multiple staging has been known as a way of using more of the available energy left after expansion in an earlier stage. Early multi-staging is taught in conjunction with steam engines. Drautz, U.S. Pat. No. 423,224 (1890) is an example of a multi-stage steam engine. The last stage may expand steam to sub-atmospheric pressure. Turbo machinery has also used multi-staging. In reciprocating aircraft engines, the supercharger is driven by elevated pressure exhaust gas at high temperature to drive a compressor to compensate for decreased air density at high altitude Multi-staging has also been proposed for positive displacement rotary engines such as that disclosed in Hubers, U.S. Pat. No. 3,783,615 (1974). Multiple staging was important in rotary engines so that the engines could reach conventional compression ratios because positive displacement mechanisms in rotary engines have low efficiencies except at low pressure ratios.

Thermodynamic advantages of multi-staging are understood, but the problems in achieving these advantages in a practical manner have prevented their implementation. Theoretical problems such as detonation, increased heat transfer losses, large mechanical forces, increased friction losses, transfer losses, large size, complexity and many other smaller problems have contributed to the lack of interest in developing such an engine. Moreover, many of the tradeoffs in basic engine design took place when the fuel was very inexpensive and there was less demand for increased engine efficiency.

Pollution, heat dissipation and low efficiency for power variation are among the potential problems confronting present engineers. Engine efficiency also suffers from heat dissipation, which can increase as compression and expansion ratios increase. The heat loss represents energy not available for useful work. Conventional engines have no means to minimize the loss of available work with heat loss. Heat loss not only results in theoretical loss of available energy, but the engine must also drive equipment to cool heated engine parts.

Throttling the charge (the amount) of fuel/air mixture flowing to the combustion chamber at any time is the conventional way of varying engine torque and power. Throttling results in large efficiency losses, which are caused by fluid flow losses and pumping. To compensate for these losses, vehicles use transmissions of up to five speeds for automobiles and up to twenty speeds for large trucks.

Another problem with conventional engines occurs because of incomplete mixture of fuel and air injected into the combustion chamber. If the fuel and air were mixed uniformly a leaner mixture could be used.

SUMMARY OF THE INVENTION

One of the principal objects of the present invention is to disclose and provide an internal combustion engine that is substantially more efficient than present engines. The theoretical efficiency in standard engines is roughly estimated by the equation:

$$1 - 1/r^{(0.3)} \qquad (2)$$

Raising the expansion ratio, r, increases efficiency. The compression ratio is also increased. The present invention uses compresion ratios as high as 40 to 1 or higher. When the fuel/air mixture is compressed that much, the increase in temperature would normally cause detonation during burning. The present invention avoids the detonation that would take place at the higher compression ratios because compression which takes place in two or more stages with cooling before the last stage of compression lowers the final compression temperature below that of a conventional engine.

The higher density of the working fluid reduces the combustion chamber dimensions, which in turn reduces the time of ignition and burning. The tendency to detonate is also reduced as the time of ignition and burning is reduced.

The next principal object of the present invention is to provide a more efficient means of varying the output torque over a wide range of values. Present standard engines vary torque with multiple gear transmissions. Achieving this objective in cars or trucks could reduce transmission size and decrease the number of gear changes. Controlling the fuel/air ratio and throttle controls provide variation in current engines, but efficiency drops off rapidly at low torque.

The multi-staged engine of the present invention provides an additional means, which is more efficient, for controlling the density of the working fluid. The controlled in the present invention limits the admission of working fluid to the compressor or limits the flow from the compressor to the accumulator. These methods drop the compression ratio so there is some loss in efficiency for thermodynamic reasons, but there is not an increase in pumping losses that occur with standard throttling. Losses from fluid flow, friction and heat transfer do not drop as fast as the drop in density.

The next primary object of the present invention is to disclose and provide an internal combustion engine of reduced size and weight. Each piston in a standard, four cylinder, four cycle engine has a power stroke every 720°. In the multi-staged engine of the present invention, a post-expansion piston has a power stroke every 360°, twice as often as the four cycle combustion stroke.

Thus, the post-expansion stage can take the place of two combustion cylinders. Therefore, the multi-staged engine of the present invention with two combustion cylinders and a single post-expansion cylinder can provide approximately the same power uniformity as a four cylinder standard engine.

Locating the post-expansion chamber between and in line with two combustion chambers and having the two combustion pistons 180° out of phase with the larger and heavier post-expansion piston, makes a balanceable engine arrangement.

A further object of the present invention is to provide an engine that can use two sides of single piston for the different tasks, one side for pre-compression of the working fluid before combustion and the other side for post-expansion of the working fluid. The use of such a dual piston eliminates one set of large piston rings and reduces the overall size of the engine.

If the pre-compression cylinder is to have the same working fluid volume intake as standard engine cylinders, the pre-compression piston must have twice the area of the piston of a standard four cylinder engine. The greater efficiency of the present invention reduces the required fuel/air mixture intake, but a lower fuel/air ratio (for less pollution) increases the required air intake. With other factors, the area of the pre-compression and post-expansion pistons could be about 2¼ times the area of standard, comparable engine pistons. The small combustion cylinders in the present invention are about one-third the diameter of the post-expansion and pre-compression pistons.

The next principal object of the present invention is to provide an internal combustion engine with reduced pollution. It is known that higher engine temperatures increase the concentration of pollutants in the working fluid. The engine of the present invention can operate at lower fuel/air ratios, which in turn reduces the temperature and pollution. The lower compression ratio in the combustion chambers of the present invention reduces the temperature further. That occurs because the fuel/air mixture is ignited from a lower starting temperature. Flame travel velocity decreases at lower fuel/air ratios. The present invention uses small combustion chambers to compensate for decreased velocity of flame travel through decreased distance of flame travel.

The present invention also uses an accumulator after pre-compression but before cooling. The accumulator provides complete vaporization of the fuel, which improves its combustion characteristics. Also, a more efficient engine uses less fuel, which proportionally results in less pollution.

The next principal object of the present invention is to disclose and provide a spark ignition engine that can use a wider range of fuels. Because the engine cools the fuel/air mixture before the final stage of compression and because of its lower combustion stage compression ratio, it operates at reduced temperatures. The engine does not require higher octane fuel that previous high-compression engines require. Spark ignition airplane engines would not require special fuels.

A further expansion of the working medium takes place in a post-expansion cylinder. The expanding working medium acts on a post-expansion piston in the post-expansion cylinder, which drives the crankshaft 180° of crankshaft phase later than the pistons of the combustion chambers. This arrangement allows the multi-staged engine with two combustion chambers to have power output of similar uniformity to a conventional four cylinder engine. By proper coordination of the valves between the combustion and post-expansion chambers, there can be an increase in efficiency for reasons explained in more detail below. The design of the piston face, which can occupy portions of the passages between the chambers, can affect the flow of gases, but is designed to reduce the post-expansion dead volumes.

The present invention takes advantage of pre-compression so that the actual compression that takes place in the combustion chambers can be minimized. The device can use smaller pistons. Moreover, the present invention can use as few as two combustion chambers. The reduced size and number of the combustion chambers reduces the heat transfer area and ultimate heat transfer to the surroundings.

Heat loss represents energy that is not available for work. It is recognized that because of additional heat losses, raising the compression ratio above customary amounts in conventional engines can result in decreased output. A decrease in heat transfer results in a more efficient engine. The lower compression ratios that take place in the combustion chamber and a lower fuel to air ratio gives lower combustion temperatures. This decrease permits higher combustion chamber surface temperatures.

The present invention can use one direction of the stroke of the piston to compress the working fluid and to receive and expand combustion products on the other side of the piston. By using the same piston to perform two different functions, engine size can be greatly reduced. The various other components that function with the piston such as crankshaft eccentrics, bearings, piston rods and rings can be reduced also.

The pre-compression piston could first compress and then discharge the fuel/air mixture through a valve normally during the approximately the last 50° of crank rotation. The engine combustion chamber takes in the working fluid during approximately 180° of crank rotation. Pressure variations in the combustion chamber which would be caused by this lack of matching, can be reduced by discharging the working fluid from the pre-compressor in a gas reservoir of substantial volume, the accumulator in the present invention. A larger reservoir decreases the pressure fluctuations. The volume of the reservoir also includes the volume of all ducts between the pre-compressor discharge valve and the combustion chamber intake valves and the high pressure passages, collectors and headers of the heat exchanger that is between the valves. Dynamic acumulators and compressors that have a gas delivery but more closely match the intake requirements of the combustion chambers (e.g. Lysholm compressors, multiple piston compressors) will greatly reduce the required reservoir volume.

Another factor affecting accumulator size will be the design of the engine accessories. A tank accumulator could be reduced in size substantially, and could even be eliminated if the ducts and heat exchanger collectors and heaters are oversized. If the reservoir volume is very large, the response to the accelerator push rod is slow because time is required to build up or drop off pressure. This slow response makes starting take less energy for cranking. If faster response is desired a dynamic accumulator or a smaller reservoir volume can be used. This would require larger starters and batteries. Although the present invention uses a tank as an accumulator, the accumulator of the present invention need not be an added object. Any means for providing high pressure gas holding capacity sufficient to reduce pressure variations from the pre-compressor as a result of combustion chamber intake to decrease fluid flow losses would perform the function of an accumulator.

The present invention includes a crankshaft or other comparable piston driver. The crankshaft drives an intake or pre-compression piston in an intake or pre-compression cylinder. During the piston movement of the piston away from its cylinder head, the fuel/air mixture is drawn into the pre-compression cylinder. During movement of the piston toward the head, the piston compresses the fuel/air mixture. The compressed fuel/air mixture passes into an accumulator. The accumulator temporarily holds the fuel/air mixture at an elevated pressure and allows the fuel and air to mix completely. A reed valve or other valve that opens under pressure to allow flow in the direction of the pressure may connect the pre-compression chamber with the accumulator so that the compressed fuel/air mixture only flows into the accumulator when the pressure in the pre-compression chamber exceeds the pressure in the accumulator.

The fuel/air mixture next passes through a heat exchanger to cool it before it is taken into one of two combustion chambers, which are 360° out of phase with each other. The expanding combustion products in the combustion chambers exert force on the pistons to drive the crankshaft. The combustion products from the combustion chamber continue expanding as they flow into a post-expansion chamber or cylinder were they drive a post-expansion piston that is also connected to the crankshaft. Added efficiency is obtained because the work that can be obtained from further expanding of the combustion products drives the post-expansion piston, that is larger than the pistons in the combustion chambers. This piston is 180° out of phase with both smaller pistons in the combustion chambers.

In one embodiment, the functions of the pre-compression and post-expansion pistons are combined into a single piston in one chamber. One side of the chamber is used for pre-compression and the other side of the chamber is used for post-expansion. This arrangement allows for a compact in-line design in which the single, large pre-compression/post-expansion chamber is between the two smaller combustion chambers. Many other features and advantages of the present invention are described in the "Detailed Description of the Preferred Embodiment" and in the drawings.

The exemplary embodiment illustrates one set of requirements only. Aircraft, automobile, truck, boat and other engines each have differing requirements that may require substantial modification to the components of the engine of the present invention.

DETAILED DESCRIPTION OF THE PREFERRED EMBODIMENT

Figure 1:
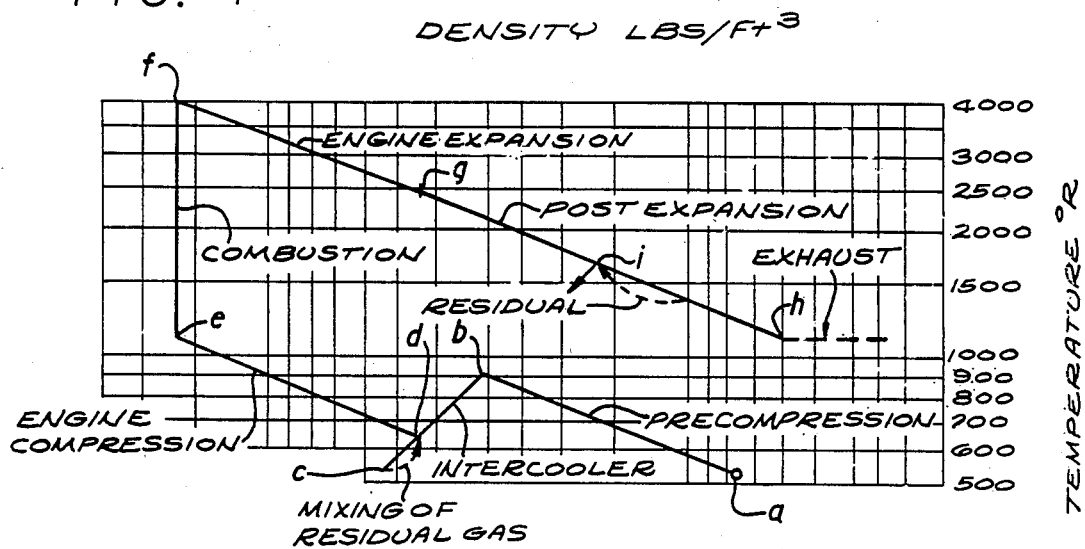
FIG. 1 is a log-log graph of the relationship of the density and the temperature of the working fluid in the exemplary embodiment of the multi-stage engine of the present invention.
Figure 2:
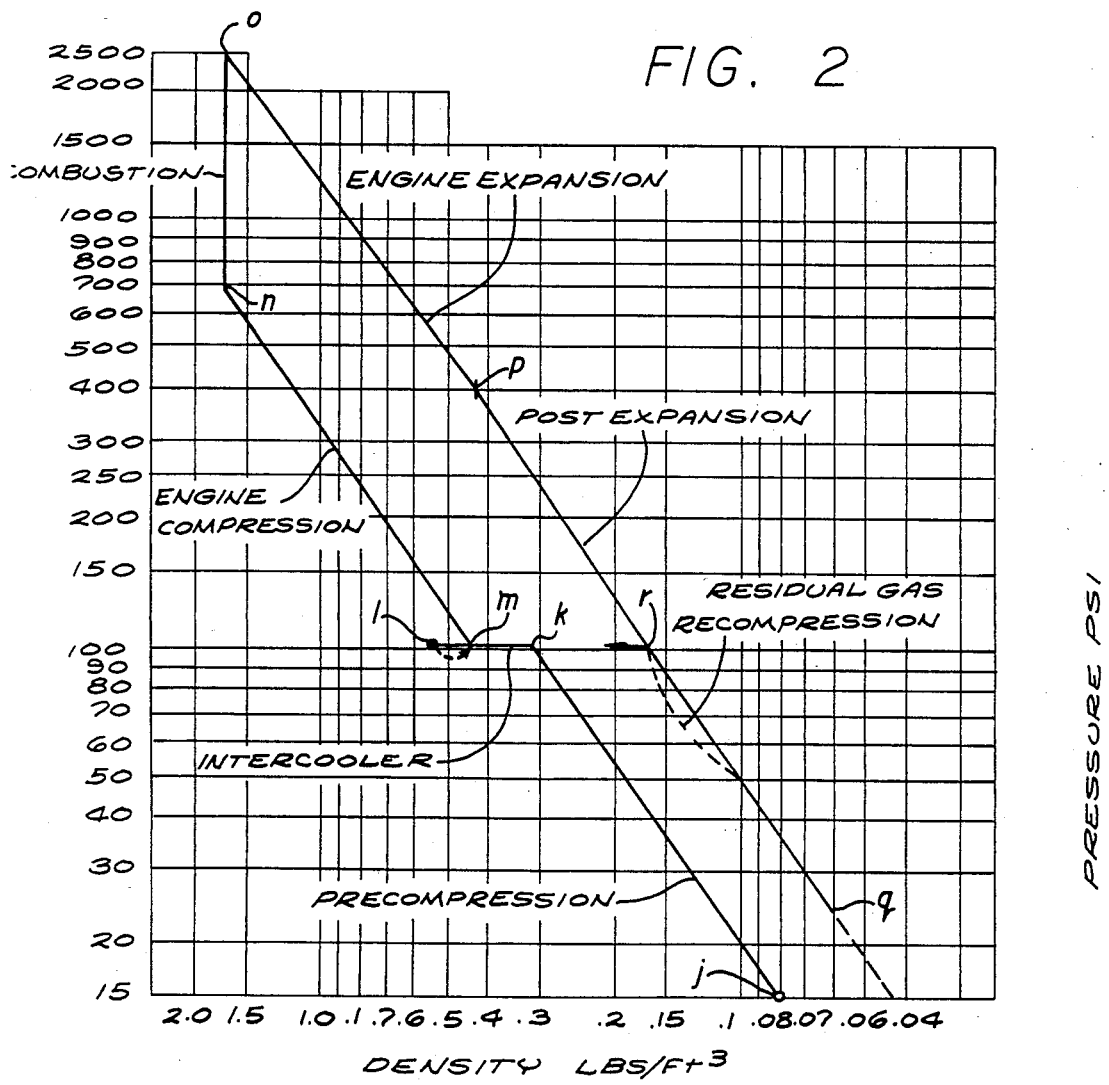
FIG. 2 is a log-log graph of the relationship of the density and pressure of the working fluid in the exemplary embodiment of the multi-stage engine of the present invention.

Adiabatic expansion and compression are straight lines on log-log coordinates. In FIG. 1, which represents the relationship of temperature to density of one configuration of the present combustion engine, the slopes are $k-1$, where k is the specific heat at constant pressure divided by the specific heat at constant volume for the working medium. See equation 1. In FIG. 2, which is the pressure versus density graph, the slopes of adiabatic expansion and compression are k. Both figures assume that cooling takes place at constant pressure and that combustion takes place at constant volume.

In FIG. 1, the fuel/air mixture intakes at point a, 0.0765 lbs/ft$^3$ and 530° R (standard ambient conditions). The working fluid is then pre-compressed to a 0.306 lbs/ft$^3$ density at 920° R to point b. The slope between points a and b is approximately 0.4, which equals $k-1$. The working fluid is then cooled in a heat exchanger at constant pressure to point c at a density of 0.53 lbs/ft$^3$ at 540° R. The slope of line $b-c = -1$. As explained in more detail with reference to an actual engine, the working fluid is then mixed with residual engine gas, which is at a temperature of approximately 1700° R. The mixing reduces the density of the working fluid to approximately 0.43 lbs./ft.$^3$ at 650° R to point d back along the same slope line.

The working fluid then undergoes engine compression to a density of 1.68 lbs/ft$^3$ at 1100° R to point e. The working fluid does undergo some engine heating from point d to point e. The slope of that segment is 0.39. Combustion takes place at constant volume and density, which raises the temperature of the working fluid to 4,000° R to point f. The working fluid then undergoes engine expansion to a 0.43 lbs/ft$^3$ density at 2,500° R to point g. The slope of segment f-g is 0.25. The working fluid then transfers to the post-expansion chamber where the expansion continues to about 0.06 lbs/ft$^3$ density at 1125° R at point h. The slope of segment g-h is approximately 0.3. The spent working fluid is then exhausted to the atmosphere. Point i shows the condition of the residual gas, which mixes with and reheats the compressed working fluid that has been cooled in the heat exchanger.

In the pressure-density cycle of FIG. 2, the fuel/air mixture intakes at 0.0765 lbs/ft$^3$ density and 14.7 psi pressure, point j. The working fluid is then pre-compressed to 0.306 lbs/ft$^3$ density to 102 psi at point k. The slope of segment j-k equals 1.4. The heat exchanger cools the working fluid at constant pressure to 0.53 lbs/ft$^3$. The working fluid is then mixed with residual engine gas which reduces the density to 0.43 lbs/ft$^3$, still at constant pressure to point m.

The working fluid then undergoes engine compression to a density of 1.68 lbs/ft$^3$ at 700 psi to point n. The slope of segment m-n is 1.39. Combustion takes place at constant volume and density so that pressure rises by the same ratio that the absolute temperature rises to about 2,500 psi at point o. The working fluid then undergoes engine expansion to a density of 0.43 lbs/ft³ at 400 psi to point p. The slope of segment o-p is 1.25. The working fluid then transfers to the post-expansion chamber where the expansion continues to above 0.06 lbs/ft³ density at point q. The slope along segment p-q is 1.3. At point q, the spent working fluid is exhausted to the atmosphere. Point r shows the residual gas reheating the compressed working fluid from the heat exchanger.

In the exemplary embodiment, a considerable amount of residual gas mixes with the incoming fuel/air supply during intake into the combustion chambers. In the illustrated embodiment, the residual gas is 25% by volume and 10% by weight. As a result, the cycle above 102 psi (point m in FIG. 2) has a mass 10% greater than the working fluid below that pressure. The work of compression and the work given off during expansion are comparably affected. Actually, the thermodynamic cycles of FIGS. 1 and 2 are idealized because they show the residual gas being removed at 102 psi. This gas is actually expanded to a much lower pressure and then recompressed to this value as the dashed lines show.

The theoretical temperature of the fuel/air mixture just before combustion in the present invention is 1104° R. The final combustion temperature is 4000° R. In a conventional 7:1 compression ratio engine, the temperature is 1260° R just before combustion, and the combustion temperature is 5000° R. As is shown in the remaining figures, the diameter of the pistons in the combustion chambers is about half that of the diameter of the pistons in a conventional engine having the same power. The smaller chambers reduce the distance that the flame must travel, which in turn, reduces the time of ignition to about 35% of a conventional engine, especially if two spark plugs are used for each combustion chamber. This improvement in the factors causing ignition in the present invention more than compensates for the reduced speed of flame travel because of the lower fuel/air ratios and higher pressure. Detonation is prevented. Theoretically, the efficiency of the cycle is also improved by using leaner than stoichiometric fuel ratios because the leaner mixtures are closer to the thermodynamic air cycle. Essentially, making the mixture leaner increases the k value. A leaner mixture also results in lower combustion temperatures which also raises the k value. Therefore, it is desirable to be able to use leaner mixtures and to have combustion take place at lower temperatures.

Figure 3:
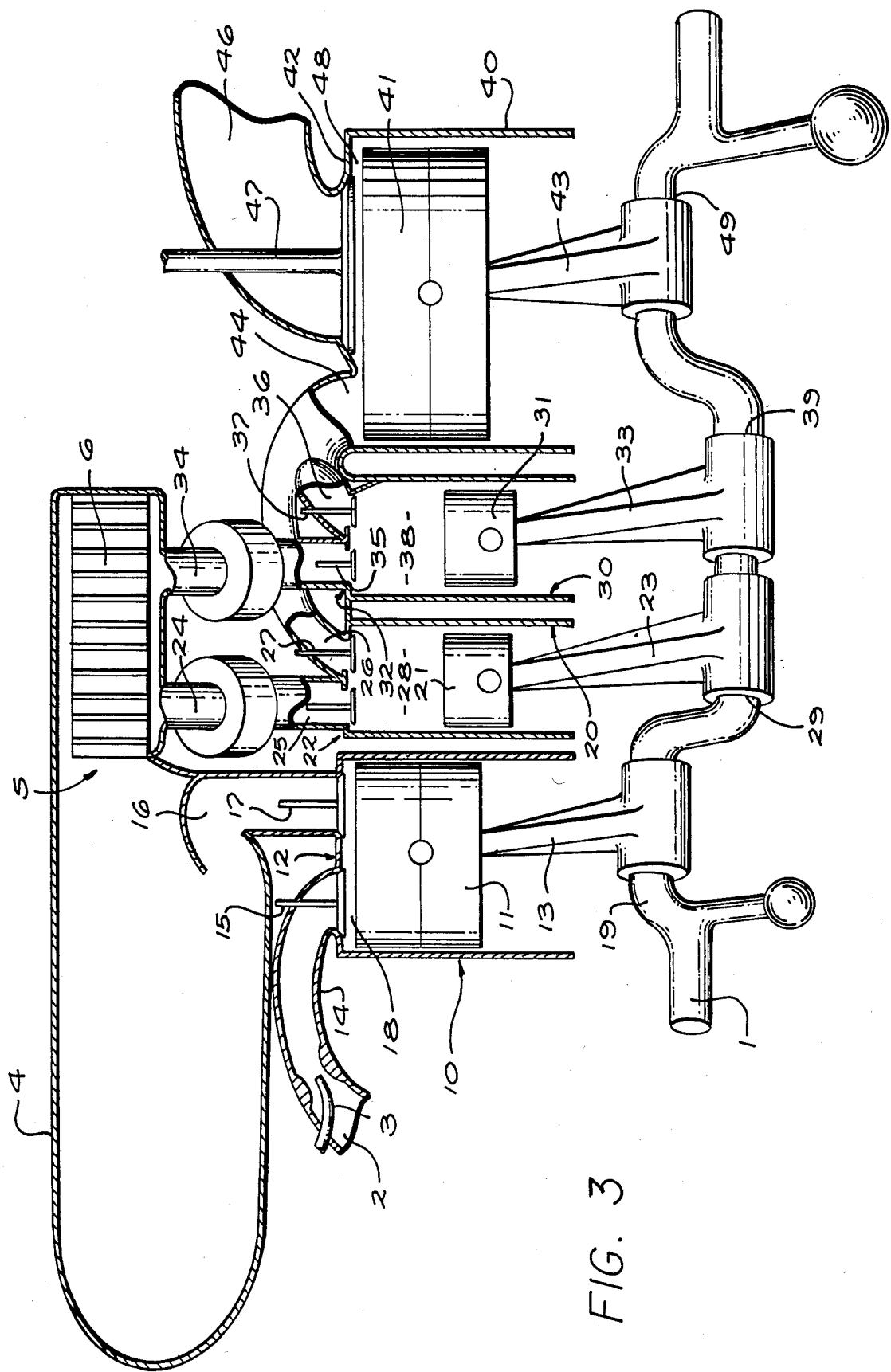
FIG. 3 is an idealized representation of the multi-staged internal combustion engine of the present invention with one pre-compression stage.

FIG. 3 is an idealized representation of the internal combustion engine of the present invention. The exemplary embodiment in FIG. 3 (and FIG. 4) is a small engine for automotive use. For different conditions, the size, fuels and other requirements can be altered. As is conventional, crankshaft 1 rotates. The great majority of internal combustion engines use a crankshaft to convert reciprocating motion of pistons into rotary motion that an automobile, airplane or other device can use. Other systems exist for converting reciprocating linear motion to rotary motion. The Hermann can engine is an example. It should be recognized that the teachings of the present invention are adaptable to these other engines. Intake duct 14 receives fuel from injector 3 and air from air intake 2. Injector 3 is representative of a carburetor or fuel injector, which controls the fuel/air ratio. The quantity of fuel/air mixture is controlled by structure discussed below with reference to timing of the pre-compression inlet valve 15.

The fuel/air mixture passes into pre-compression chamber 18 when crankshaft 1 reciprocates piston rod 13 to pull pre-compression piston 11 away from head 12 (down in FIG. 3) in cylinder 10. Section 19 of crankshaft 1 rotates around the axis of the crankshaft between its top dead center position shown in FIG. 3, which corresponds to the closest movement of piston 11 toward head 12, and a bottom dead center position, which corresponds to the position of the piston farthest from head 12. Inlet valve 15 is open, and outlet valve 17 is closed as crankshaft section 19 pulls piston rod 13 to pull piston 11 downward.

As piston 11 moves down away from the head in pre-compression chamber 18 and valve 15 is open, a decrease in pressure in the chamber causes the fuel/air mixture to be drawn into the pre-compression chamber. Valve 15 may close when pre-compression piston 11 reaches its bottom dead center position, or the timing of its opening and closing may change in response to engine torque settings. Valve 17 remains closed.

Crankshaft section 19 continues to rotate from the bottom dead center position toward head 12 (up in FIG. 3) so that piston rod 13 pushes pre-compression piston 11 toward the head to compress the fuel/air mixture.

Outlet valve 17 opens when the pressure in pre-compression chamber 18 is equal to the pressure in accumulator 4. The compressed fuel/air mixture can flow past open valve 17 through duct 16 into accumulator 4. Accumulator 4 is a pressure tank in the exemplary embodiment, which functions to hold pressurized fuel/air mixture. In FIG. 3, the accumulator is shown to be above the engine, but it may be located in any convenient space. Ducting between outlet valve 17 and the combustion chambers as well as any other ducts and passages described below would function as an accumulator. A piston-type accumulator could also be used. Moreover, there are some type of pre-compressors that may not require large volumes of pressurized gas storage.

Through compression, the volume of fuel/air mixture in accumulator 4 is at an elevated temperature, which for the exemplary embodiment is approximately 460° F. (238° C.). The accumulator also retains the fuel/air mixture for a relatively long time. Therefore, all of the fuel should vaporize and mix thoroughly with the air.

Outlet valve 17 may be a reed valve (flexure-close off valve) that opens when the pressure in pre-compression chamber 18 exceeds the pressure within accumulator 4 during the movement of piston 11 toward head 12. The reed valve remains closed as long as the pressure in accumulator 4 exceeds the pressure in the pre-compression cylinder. When the engine is first started, the pressure within accumulator 4 is closer to atmospheric pressure. At that time, pressure in pre-compression cylinder 10 becomes greater than the pressure in the accumulator earlier during movement of piston 11 toward head 12. After some time, the pressure in accumulator 4 reaches a higher, steady state pressure. As explained in more detail below, the pressure in the accumulator can vary depending on required torque. The pressure in chamber 18 does not exceed the pressure in accumulator 4 until later in the upstroke (e.g., the last 50° of crank rotation). Reed valve 17 does not open until then. When the reed valve opens, however, the pressure differential is slight so that the velocity of the gas flow is low.

As explained in more detail below in conjunction with FIGS. 4 and 5, the timing of the opening and closing of inlet valve 15 may vary as a function of engine demand. At times of high power requirements, the engine requires large volumes of air and fuel. Valve 15 opens throughout movement of piston 11 away from head 12. When the engine is closer to idling speed, it is unnecessary to add large volumes of fuel/air mixture to accumulator 4. Valve 15 can open later during the movement of piston 11 away from head 12 and/or close earlier during the movement of the piston away from the head. Suggested structure for controlling valve 15 in response to power demands is addressed during the discussion of FIGS. 4 and 5.

Valve 17 is the reed valve, and valve 15 is the controlled valve in the exemplary embodiment. Valve 15 could be the reed valve, and valve 17 could be the controlled valve.

The fuel/air mixture next flows from accumulator 4 through duct 5 and through heat exchanger 6. High effectiveness heat exchanger 6 cools the fuel/air mixture, which then flows through ducts 24 and 34 into combustion chambers 28 and 38. The heat exchanger is one having a low pressure drop. Decreasing the temperature is desirable because the fuel/air mixture is further compressed in combustion chambers 28 and 38 as discussed below. By having the fuel/air mixture at a low initial temperature but at a high pressure, the fuel/air mixture can be compressed further and still remain below the point where detonation would take place during combustion.

Three or more stages of compression are also feasible, but the cost of providing the stages may outweigh the added efficiency that added stages provide. The FIG. 6 embodiment, described below, shows two pre-compression stages before the compression takes place in the combustion chambers.

Each of the two combustion chamber 28 and 38 of the present invention is generally conventional, but they are smaller than conventional chambers because they have higher inlet fuel/air mixture density. Pistons 21 and 31 reciprocate in cylinders 20 and 30 under the action of piston rods 23 and 33 driven by sections 29 and 39 of crankshaft 1. Both combustion chambers operate in a four cycle mode and repeat their operation every 720° of crankshaft rotation.

If the combustion chambers and pistons operated conventionally, section 29 of crankshaft 1 moves piston rod 23 and piston 21 away from head 22. Inlet valve 25 opens so that fuel/air mixture from accumulator 4 passing through heat exchanger 6 and duct 24 is drawn into combustion chamber 28. At approximately bottom dead center, inlet valve 25 closes. Outlet valve 27 remains closed. Piston 21 moves toward head 22 in its compression upstroke. When the fuel/air mixture is almost fully compressed, a spark plug (not shown) ignites the fuel/air mixture. The expanding combustion products would push piston 21 downward, away from the head to rotate section 29 of crankshaft 1.

The next stroke of piston 21 toward head 22 forces the exhaust gases past open valve 27 into duct 26. Valve 27 then would close and the four cycles would repeat. Duct 26 connects to the exhaust system. In the present invention, however, expanding combustion products that still can perform work, flow from duct 26 into post-expansion chamber 48, which is described in more detail below.

Combustion chamber 38 operates exactly the same as chamber 28, but the two pistons 21 and 31 are 360° out of phase with each other. That is, when fuel/air mixture burns and expands in chamber 28, piston 31 in chamber 38 moves away from head 32 and receives the fuel/air mixture past valve 35 through duct 34.

The combustion products from combustion chambers 28 and 38 flow through outlet ducts 26 and 36 and through inlet duct 44 into post-expansion chamber 48. Section 49 of crankshaft 1 acting through piston rod 43 reciprocates large post-expansion piston 41 in post-expansion cylinder 40. The post-expansion chamber receives exhaust gases from combustion chambers 28 and 38 during the movement of post-expansion piston 41 away from head 42 and the corresponding movement of piston 21 toward head 22 and then 360° of crankshaft rotation later from movement of piston 31 toward head 32. The ways in which the post-expansion chamber 48 and the combustion chambers 28 and 38 coordinate with each other and exchange the combustion products are important features of the present invention and are described in detail below.

Large, post-expansion piston 41 has a greater area than pre-compression piston 11 or than the combined areas of pistons 21 and 31 and is also greater in area. Large piston 41 moves 180° out of phase to smaller pistons 21 and 31. It is at top dead center when small pistons 21 and 31 are at bottom dead center. Note also that piston 41 completes its cycle during each 360° of crankshaft rotation, but smaller pistons 21 and 31 require 720° of crankshaft rotation to complete their cycles.

Valve 47, which is between post expansion chamber 48 and exhaust manifold 46, and valves 25, 27, 35 and 37 of combustion chambers 28 and 38 coordinate in one of two arrangements that vary from conventional internal combustion engines. In one procedure, valve 27 remains open during the expansion stroke of the gas in post-expansion chamber 48. Valve 47 opens slightly early as post-expansion piston 41 approaches bottom dead center. 360° of crank rotation later, valve 37 of combustion chamber 38 is open during the expansion stroke of gas in post-expansion chamber 48, and valve 47 also opens slightly early near the end of the downstroke of piston 41. Generally, only valves 25 and 27 and combustion chamber 28 are discussed in further detail.

By adjusting the timing of valves 27 and 47, it is possible for the pressure of the gas in chamber 28 to drop approximately to atmospheric pressure. Under those conditions, when valve 27 closes and then valve 25 opens and when piston 21 begins movement away from head 22, the amount of fuel/air mixture flowing from duct 24 into combustion chamber 28 exceeds the displacement that piston 21 normally produces. This occurs because the volume of residual exhaust gas from the previous cycle when piston 21 is at top dead center is much lower in pressure than the pressure in accumulator 4. The gas remaining in chamber 28 is compressed to equal the pressure of the fuel/air mixture in accumulator 4 by the in-rush of the fuel/air mixture as valve 25 opens. The ratio of the inlet gas volume while piston 21 is still at top dead center to the residual gas volume is approximately equal to the pre-compression ratio.

If valve 27 opens during the expansion stroke of piston 21, expanding gas flows through duct 44 into post-expansion chamber 48 where it continues to expand against post-expansion piston 41. The engine thus uses the work available in the expansion of combustion products. Valve 27 closes during movement of piston 41 toward head 42.

In the other method of operation, valve 27 closes before the exhaust stroke of piston 21 is completed. With proper timing, valve 27 closes when the gas in combustion chamber 28 will re-compress to the pressure of the gas in accumulator 4 at top dead center of piston 21. At the beginning of piston movement away from head 22, when valve 25 opens, there is no appreciable, rapid flow from duct 24 into combustion chamber 28 because the pressure in accumulator 4 and chamber 28 is almost equal. The work used to recompress the gas in combustion chamber 28 is returned to drive piston 21 during movement away from head 22.

The volume of fuel/air mixture that flows into combustion chamber 28 during movement of piston 21 away from head 22 is approximately equal to the displacement of piston 21. When section 29 of crankshaft 1 returns piston 21 to the top dead center position, the fuel/air mixture in combustion chamber 28 is compressed. At an appropriate time, a spark plug (not shown) generates a spark to ignite the fuel/air mixture. The temperature and pressure of the gas within combustion chamber 28 rises to approximately 4000° R and 2500 psi, and density remains constant.

The gas acts on the face of piston 21 to rotate crankshaft 1. Section f-g in FIG. 1 and section o-p in FIG. 2 show thermodynamically the expansion of the combustion products pushing piston 21 away from head 22. If the engine did not have post-expansion chamber 48 and piston 41, available work would be completed at 0.42 lbs/ft$^3$ (point g in FIG. 1 and point p in FIG. 2). The gas still has available work, which piston 4 uses.

Expanding combustion products in chamber 28 can be above atmospheric pressure if valve 47 closes before all of the gas in ducts 26, 36 and 44 and post-expansion chamber 48 reaches atmospheric pressure. The trapped gas is compressed so that the pressures in ducts 26, 36 and 44 and post-expansion chamber 48 equals the pressure in combustion chamber 28 at about top dead center of large piston 41. Thus, when valve 27 opens at about top dead center of large piston 41, there is no sudden flow of gas past valve 27, which would cause an energy loss. When valve 27 opens, duct 44 provides a direct connection between chambers 28 and 48. Now when small piston 21 moves toward head 22 and large piston 41 moves away from head 42, the total volume in two chambers 28 and 48 above the two pistons 21 and 41 increases. Somewhat before piston 21 reaches its top dead center position, valve 27 closes. As large piston 41 continues its movement toward bottom dead center, the total volume in ducts 26, 36 and 44 and chamber 48 continues to increase.

Valve 47 starts to open and is fully open shortly after piston 41 reaches the bottom dead center position. When valve 47 is open, piston 41 can expel gases to atmospheric pressure through duct 46. During the movement of piston 41 away from head 42, the pressure acting on its face produces work 180° later than that produced by regular pistons 21 and 31. Energy is supplied to crankshaft 1 by the two combustion pistons 21 and 31 and by post-expansion piston 41. As large piston 41 returns to the top dead center position, gas in chamber 48 flows out past valve 47 through exhaust manifold 46. The exhaust manifold may connect to an ejector (not shown).

The principal discussion has been with regard to the cooperation between small piston 21 and large piston 41. Piston 31 operates similarly to piston 21 except that its steps take place 360° later.

The main advantage of this design and method is that it eliminates the highly turbulent gas flow past the valves, which eliminates a very high heat transfer coefficient and pressure loss. The arrangement described has many other advantages. The present invention uses a heat exchanger 6 to cool the compressed fuel/air mixture. This arrangement permits overall compression ratios of over 30 without engine detonation and increases the pressure ratio of combustion to increase the availability of the energy released by combustion. As explained in conjunction with the FIG. 6 embodiment, it is also possible to control the temperature output of the heat exchanger to set the combustion chamber compression temperature. One can cool the engine with ambient air through the use of an ejector powered by exhaust gas from the engine.

The use of an accumulator 4 provides sufficient time for the fuel to vaporize completely and mix with the air. The volume of the accumulator is large enough that there is little reduction in pressure in accumulator 4 during the intake into combustion chambers 28 and 38. Becuase the large piston 41 is moving away from the head 42 when smaller, conventional pistons 21 and 31 are moving toward heads 22 and 32, the secondary expansion of the combustion products takes place in large chamber 48 180° of crankshaft travel after partial expansion takes place in the conventional combustion chambers 28 and 38. The present engine therefore provides power uniformities similar to that occurring in a conventional four-cylinder engine even though it has only two combustion chambers. The engine is relatively simple and much more efficient than a conventional engine.

Except when valves 27 and 37 are closed, valve actuation forces can remain at conventional levels if the pressure on both sides of the valves is balanced. Closing either combustion chamber valve 27 or 37 and of valve 47 of post-expansion chamber 48 can re-compress dead volume gas to the level of the pressure on the other side of the valve. Keeping equal pressure on both sides of the valves prevents sudden in-rushes of gases when the valves open and lowers the noise level of the engine. Each actual valve 27 and 37 needs to be pressure balanced because the pressure in ducts 26 or 36 can exceed the pressure in combustion chambers 28 or 38 during part of the cycle otherwise very stiff valve springs would be required. The pressure could inadvertently open the values if they were not balanced. The design of the pressure balanced valves is discussed with reference to the FIG. 4 embodiment.

Figure 4:
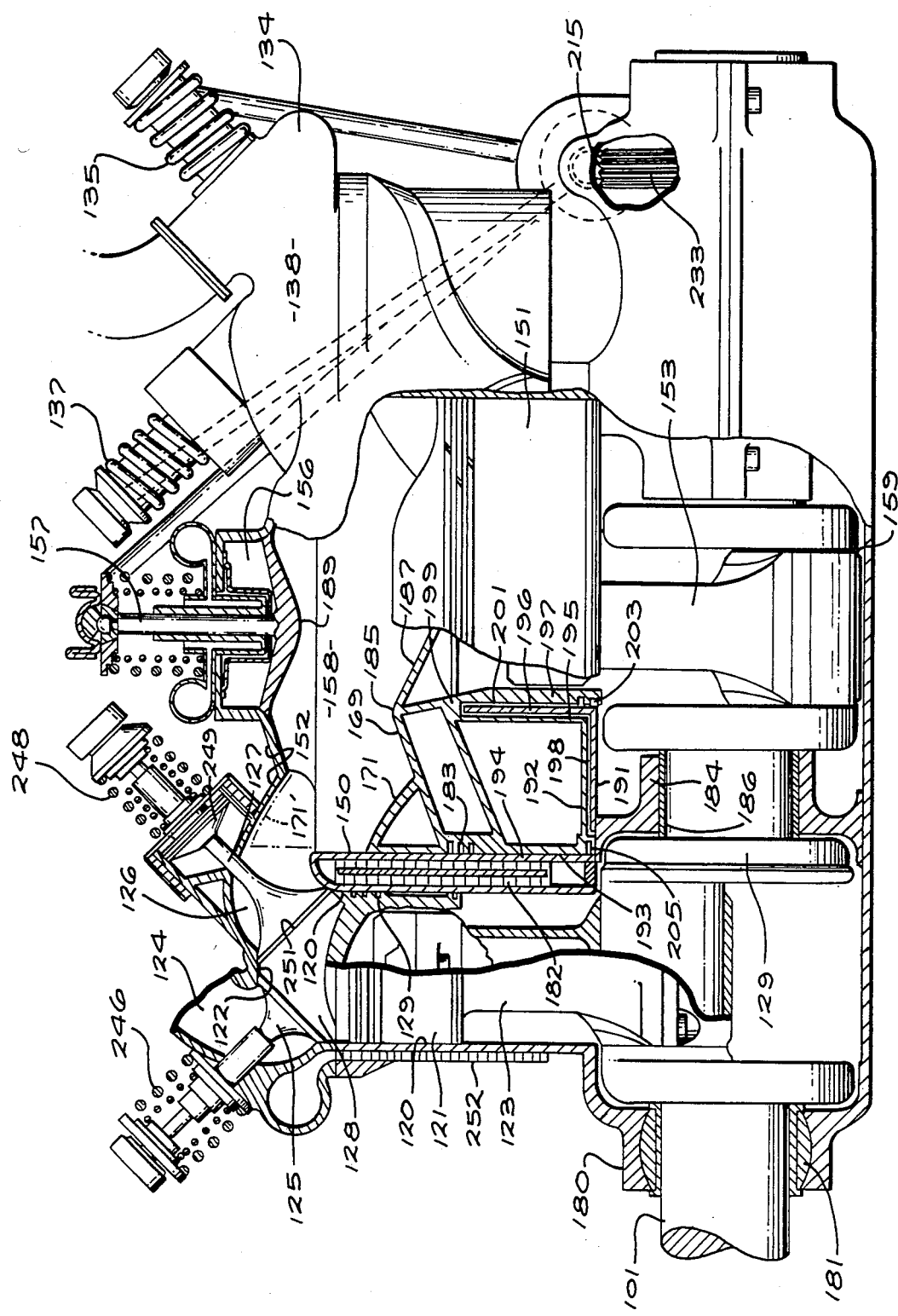
FIG. 4 is a cut-away view of another specific embodiment of the multi-staged internal combustion engine of the present invention.
Figure 5:
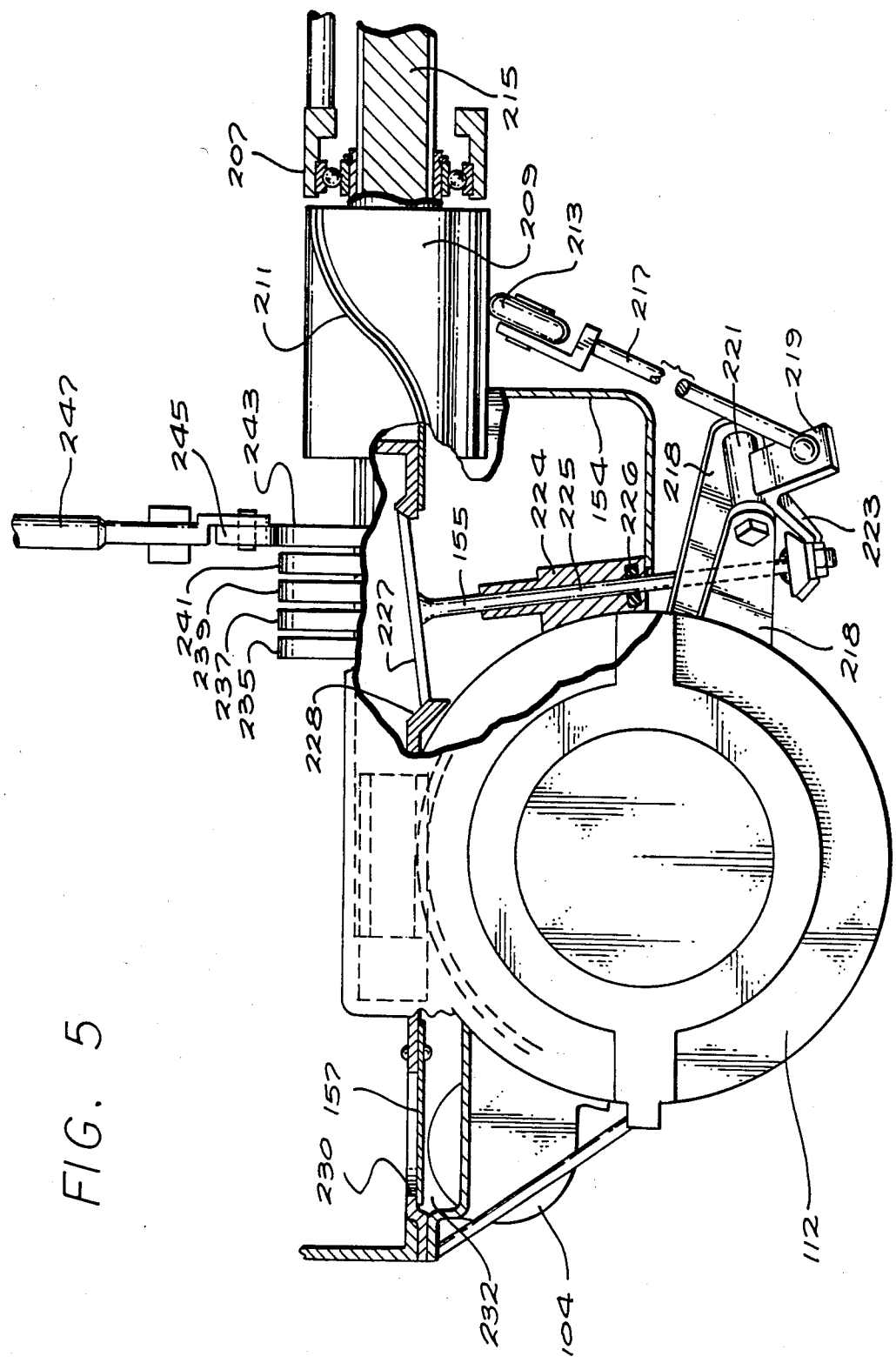
FIG. 5 is a partial end view of FIG. 4 showing some of the components of the multi-staged engine of the present invention. Some of the cams that drive the valve are shown in detail.

FIGS. 4 and 5 show a less idealized representation of the internal combustion engine of the present invention than FIG. 3 shows. Crankshaft 101 (FIG. 4) rotates in bearing 181 in housing 180. An intake manifold receives fuel from an injector and air from an air intake (not shown in FIGS. 4 and 5).

In the idealized representation of FIG. 3, pre-compression cylinder 10 and post-expansion cylinder 40 were at opposite sides of the engine to permit explanation in the order that gas flowed through the engine. In the exemplary embodiment of FIG. 4, the pre-compression cylinder and the post-expansion cylinder are coaxial and form a dual cylinder. A single piston having two sides replaces the separate pre-compression and post-expansion pistons of FIG. 3.

In the exemplary embodiment of FIG. 4, dual piston 151 is mounted within dual cylinder 150. Piston rod 153 extends from crankshaft section 159 to the bottom, center of dual piston 151. Rings 183 around the outside of piston 151 prevents gas flow between the piston and the cylinder as the piston reciprocates. Top face 185 of piston 151 has a central conical indentation 187, downwardly sloping wall 169 and upwardly projecting duct filler 171. The top surface conforms generally to the shape of head 152 and valve disk 189 above piston 151. At top dead center of piston 151, duct filler section 171 extends into and occupies space 126 in a manner discussed below. The projection of duct 171 is element 171' and is shown in phantom.

The top portion of piston 151 in the upper part of dual cylinder 150 is the post-expansion element of the FIG. 4 embodiment. The pre-compression elements are on the bottom of the piston. Piston 151 has a flat, annular bottom wall face 191 extending between the space between outer wall 193 and inner surface 195 of piston 151. Wall 197 is concentric with wall 193, and bridge 199 connects the two inner walls 195 and 197 to create a space 201. The inside face of inner wall 197 has conventional elements (not shown) for attaching piston 151 to piston rod 153.

Annular bottom surface 192 extends inward from portion 194 of cylindrical wall 150 to inner cylindrical cup 196. Cup 196 extends into space 201 between walls 195 and 197. Cylinder wall 150 attaches to a part of cylinder wall 120 of combustion chamber 128. The operation of the combustion chambers are discussed below. Cooling fins 182 extend between walls 150 and 120. The engine provides cooling air to the fins in a manner discussed below.

Bottom wall 192 also includes a bearing extension 184 that also connects to housing 180. Bearing extension 184 holds a bearing 186 to support crankshaft 101. Rings 203 extend outward near the bottom of inner cylindrical wall 196 to contact cup 196 to seal off that portion of piston 151. The exemplary embodiment also has an additional outer oil ring 205.

In theory, it would be possible to mount rings 203 on the inner surface of wall 195 or on the outer surface of cup 196. There are, however, some difficulties. Therefore, the additional structure shown in FIG. 3 to mount the rings is desirable.

The fuel/air mixture enters the space between annular wall 191 of piston 151 and annular wall 192 of cylinder 150 through valves which are shown in FIG. 5 but are not shown in FIG. 4. The fuel/air mixture is drawn into the bottom portion of cylinder 150 during the movement of piston 151 toward head 152. This movement of piston 151 toward head 152 corresponds to the movement of piston 11 (FIG. 3) away from head 12 in pre-compression cylinder 10. The valves for accomplishing the admittance of the fuel/air mixture are discussed next.

The accelerator control attaches through appropriate structure to accelerator rod 207 (FIG. 5). When the accelerator rod is depressed and moves to the left (FIG. 5), it moves three dimensional cam 209 to the left toward the engine center line. Cam 209 has a surface bulge 211, which occurs every 180° around cam 209 and also varies in circumferential distance relative to longitudinal position. Cam follower roller 213 contacts bulge 211 as cam 209 rotates with rotation of shaft 215. Follower rod 217 connects in a manner described below to intake valve 155. In FIG. 5, follower rod 217 is shown rotated from its true position under and in back of three dimensional cam 209 so that the cam follower 213 shows functionally its contact with the cam 209 but not at its true angle, so its various parts can be visible. Then, it connects to rocker arm 219. The arm projects outward from pivot 221 that pivots between bracket arms 218 extending outward from housing 112. A second arm 223 also extends outward from pivot 221. Stem 225 of valve 155 attaches to the end of arm 223. Stem 225, which is seated by O-rings 226, extends through support 224

Valve face 227 engages seat 228 at the entrance of pre-compression cylinder 150 (FIG. 5). As bulge 211 moves follower rod 217 outward, the follower rotates arms 219 and 223 around pivot 221 to move valve 155 upward. For best performance two valves 155 yoked together would be used. As a result, the fuel/air mixture flows from intake manifold 154 into the pre-compression portion at the bottom of dual cylinder 150 (FIG. 4).

The fuel/air mixture flows into the bottom portion of dual cylinder 150 as dual piston 151 moves upward. The left to right position of three dimensional cam 209 changes the time that valve 155 remains open. The circumferential distance of bulge 211 is greater at the right end of cam 186 than at the left end (FIG. 5). Therefore, if accelerator rod 207 pushes cam 209 to the left, bulge 211 encounters roller 213 of the follower rod 217 for a greater part of the rotation of the cam. As a result, valve 155 remains open for a longer period of time allowing more fuel/air mixture to flow through the valve to be compressed.

As dual piston 151 moves downward, it forces the fuel/air mixture through opening 230 (FIG. 5), which is closed by reed valve 157. When the reed valve is open, the compressed fuel/air mixture flows from the bottom portion 198 (FIG. 5) of dual cylinder 150 through opening 230 and into channel 232. The channel extends to accumulator 104. Reed valve 157 only opens when the pressure in dual cylinder 158 is greater than the pressure in channel 230 and accumulator 104.

The fuel/air mixture next flows from accumulator 104 to the heat exchanger, which is not visible in FIGS. 4 and 5. From the heat exchanger, the cooled but compressed fuel/air mixture passes through ducts 124 and 134 into combustion chambers 128 and 138 (FIG. 4). Each combustion chamber 128 and 138 is generally conventional but smaller than conventional chambers because they receive a much denser fuel/air mixture. Both combustion chambers operate in a four cycle mode. In FIG. 4, only piston 121 is visible. The drawing does not show the inside of the other combustion chamber 138. Therefore, most of the continuing reference is made only with regard to combustion chamber 128.

Combustion chamber 128 has a piston 121 driven by piston rod 123, which is reciprocated by section 129 of crankshaft 101. The piston within combustion chamber 138 reciprocates 360° out of phase with drive piston 121 in combustion chamber 128. Piston 121 repeats its cycle of two upstrokes and downstrokes every 720° of crankshaft rotation.

Piston 121 reciprocates along cylindrical combustion chamber wall 120. Piston rings 129 prevent gases from flowing between the outside of piston 121 and cylindrical wall 120. The top face of piston 121 is domed or hemispherical. Means are provided for directing cool air through fins 252 and 182 for cooling combustion chamber wall 120.

Combustion piston 121 moves downward in combustion cylinder 120 pushing piston rod 123 downward against crankshaft section 129. Inlet valve 125 closes duct 124 leading from accumulator 104. Valve 125, and the four other valves that are described below are controlled by cams 235, 237, 239, 241 and 243. The five cams rotate with rotation of shaft 215 (FIGS. 4 and 5). Shaft 215 rotates through its connection with worm 233 (FIG. 4). A follower, only one of which, 245, is shown in FIG. 5, contacts the face of one of the cams. Radial movement of roller 245 moves cam rod 247 outward. By the appropriate connecting mechanism, each cam rod, such as cam rod 247, moves the appropriate valve, such as valve 125, inward.

Spring 246 (FIG. 4) pushes outward on valve 125. The pressure in inlet duct 124 leading from accumulator 104 may be very high. If, at that time, the pressure in combustion chamber 128 is relatively low, the pressure in duct 124 tends to unseat valve 125. Springs 264 maintain valve 125 in a seated condition unless the appropriate cam rod pushes valve 125 downward.

Valve head 189 of valve 157 closes the post-expansion chamber above dual piston 151. When valve 157 is open, exhaust gas passes into exhaust manifold 156. Valves 125, 127, 135 and 137 of combustion chambers 128 and 138 coordinate in one of two arrangements. In the first arrangement, valve 127 opens at the start and remains open during the expulsion stroke of the gas in chamber 128. Valve 157 opens before dual piston 151 reaches bottom dead center. The pre-compression stage occurs at the bottom side of piston 151 between piston face 191 and annular chamber wall 192. The downstroke of piston 151 provides the equivalent pre-compression that the upstroke piston 11 provides.

360° of crank rotation later, valve 137 of combustion chamber 138 also opens during the expulsion stroke of gas in the chamber, and valve 157 also opens slightly early near the end of the downstroke of its piston.

The pressure of the gas in chamber 128 can drop to atmospheric pressure through adjusting the timing of valves 127 and 157. As valve 127 closes, valve 125 opens and piston 121 begins movement away from head 122. The flow of fuel/air mixture from duct 124 into combustion chamber 128 exceeds the displacement that piston 121 normally produces. That is, the volume of residual exhaust gas from the previous cycle when piston 121 is at top dead center is much lower in pressure than the pressure in duct 124 and accumulator 104. The in-rush of the fuel/air mixture when valve 125 opens compresses any gas that remains in combustion chamber 128 until that gas is equal in pressure to the pressure of the fuel/air mixture in duct 124 and accumulator 224. The ratio of the inlet gas volume to the residual gas volume is approximately equal to the pre-compression ratio. Valve 127 is closed during the upstroke of piston 121 so that the gas does not flow into post-expansion chamber 158.

In the other method of operation, valve 127 closes before piston 121 completes its expulsion upstroke. Valve 127 closes when the gas in combustion chamber 128 will re-compress to the pressure of the gas in duct 124 and accumulator 104 at the end of the upstroke of piston 121. When the piston begins its downstroke and valve 125 opens, there is no appreciable, rapid flow of the fuel/air mixture from duct 124 past the valve into combustion chamber 128 because the pressures on both sides of the valve are approximately equal. Most of the work used to recompress the gas in combustion chamber 128 is returned as available work later in the cycle.

The volume of fuel/air mixture flowing into combustion chamber 128 during downstroke of piston 121 approximately equals the displacement of the piston. When piston 121 reverses and then reaches the top dead center position, the piston has compressed the fuel/air mixture in combustion chamber 128. A spark plug (not shown) then generates a spark to ignite the fuel/air mixture. The expanding gas acts on top face of piston 121 to create a downward force, which rotates crankshaft 101.

Duct 126 connects combustion chamber 128 with the top, post-expansion region 158 of cylinder 150. Piston 121 continues its expansion stoke to bottom dead center where the piston reverses its direction. Valve 127 opens at this point. At a set time (determined by the faces of one of cams 235, 237, 239, 241 or 243) during the upstroke, valve 127 closes and blocks flow from combustion chamber 128 into duct 126, thus completing the combustion chamber cycle. During this expansion, combustion products in chamber 128 are still above atmosphere pressure. If valve 157 closes before all of the gas in duct 126 reaches atmospheric pressure, trapped gas in the duct is recompressed so that the pressures in the duct and in dual chamber 158 is equal to the exhaust pressure in combustion chamber 128 (or 138) at about top dead center of dual piston 151. Also at top dead center of dual piston 151, section 171' (FIG. 4) extends into duct 126 to reduce the trapped volume of combustion products in ducts 126 and 136 (and 144) and post-expansion chamber 158. Valve 127 opens at about top dead center of dual piston 151. There is no sudden flow of gas past valve 127. When valve 127 opens, duct 126 provides a direct connection between chambers 128 and the top of dual chamber 158. When piston 121 moves upward and dual piston 151 moves downward, the total volume in the two chambers 128 and 158 above the two pistons 121 and 151 increases because the area of duel piston 151 is much greater than the area of piston 121. Just before piston 121 reaches its top dead center position, valve 127 closes. The total volume in ducts 126 and 144 and chamber 128 continues to increase as large piston 121 continues its movement toward bottom dead center. The cam mechanism opens valve 157 shortly before dual piston 151 reaches the bottom dead center position. When valve 157 is open, dual piston 151 expels gases at atmospheric pressure through duct 156.

The pressure of expanding gas acting on the face of dual piston 151 during its movement away from head 152 produces work 180° later than that produced by piston 121 and the other piston in combustion chamber 138. Energy is supplied to crankshaft 101 more evenly than two combustion chambers would supply without post-expansion in dual chamber 158. The multi-staged engine approaches the evenness of a conventional four cylinder engine.

Valves 127 and 137 may be pressure balanced valves. When dual piston 151 compresses gas in the top portion of post-expansion chamber 158, the rear face of valve 127 is exposed to high pressure. As a result, there is a tendency for valve 127 to open. To overcome this tendency, spring 248 can provide sufficient closing force, but it is difficult for the cam and rod to provide enough force to open the valve. Face 249 has an area slightly less than the area of the back 251 of the valve 127. The other side of face 249 is at atmospheric pressure, which provides a force that reduces the force that spring 248 would have to provide. Pressurized gas passes through opening 250 and pressurizes face 249 to balance approximately the differential pressure load in the opposite direction.

Finned cooling passages, such as passage 252, are provided on the outside of cylindrical walls 120 of the combustion chambers. Finned cooling passage 252 is representative. Cooling can be provided at other locations where it is necessary. Air for cooling can come from several sources. The exhaust gas in exhaust manifold 156 (FIG. 4) can drive a blower, ejector or other air flow device. The crankshaft may also be connected to an air compressor.

Figure 6:
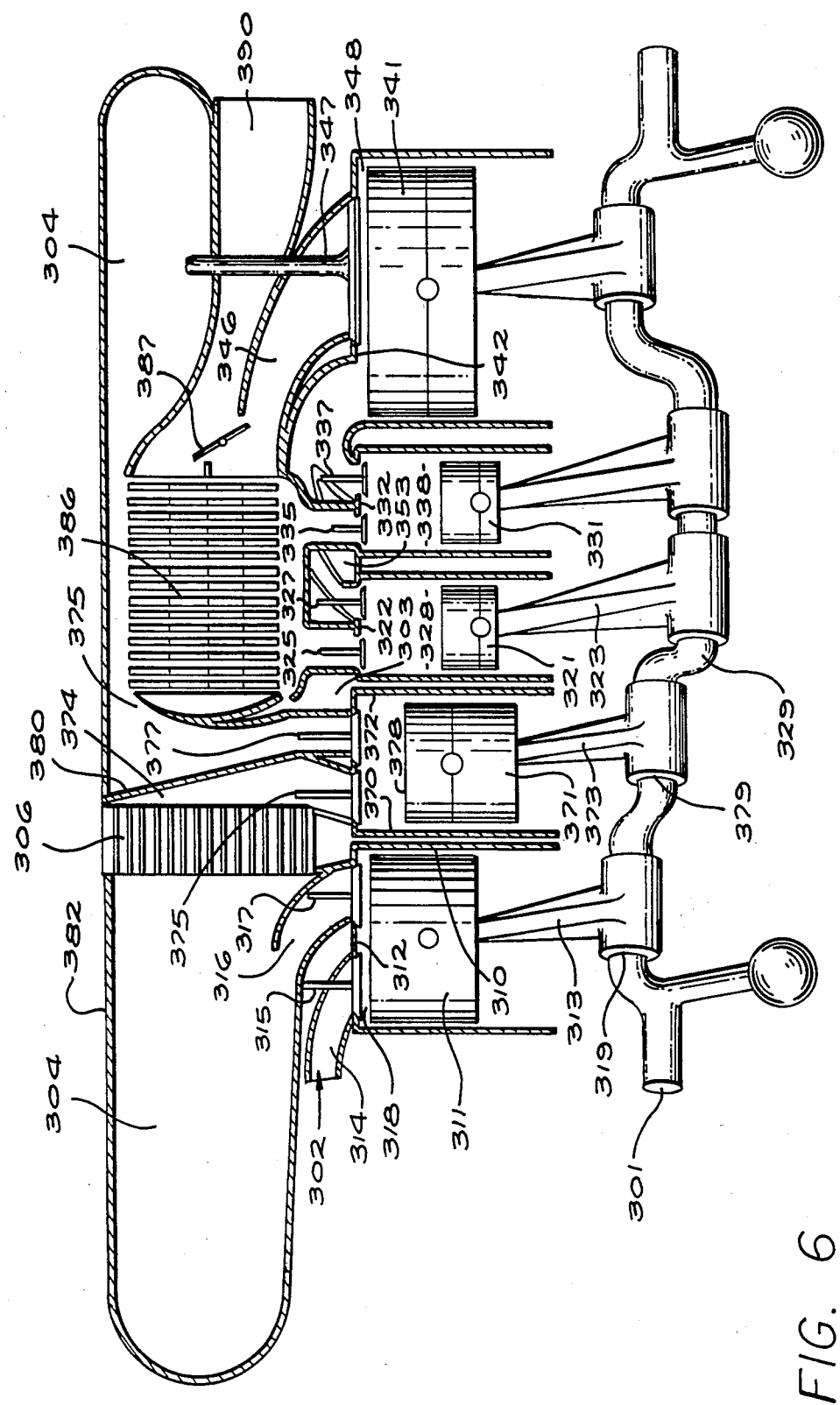
FIG. 6 is another idealized representation of the engine of the present invention. It has two pre-compression stages rather than the single stage that the FIG. 3 engine has.

Applicant's teaching cam also be adapted to a compression ignition (diesel) version. FIG. 6 shows a representative exemplary embodiment of the compression ignition version. The FIG. 6 version also has more than one pre-compression stage. Although primarily adapted to the compression ignition version, two pre-compression stages with cooling after each could also be used with the spark ignition version of FIGS. 3 through 5.

Air from air intake 302 passes through intake duct 314 into first intake chamber 318 when crankshaft 301 reciprocates first pre-compression piston 311 during its movement in cylinder 310 away from head 312 (down in FIG. 6). Section 319 of crankshaft 301 rotates around the axis of the crankshaft between its top dead center position shown in FIG. 6, which corresponds to the closest movement of piston 311 toward head 312, and a bottom dead center position, which corresponds to the position of the piston farthest from head 312. Inlet valve 315 is open and outlet valve 317 is closed as crankshaft section 319 and piston rod 313 pull piston 311 downward.

As piston 311 moves down away from the head in first pre-compression chamber 318 and valve 315 is open, the air is drawn into the pre-compression chamber. Valve 315 may close when pre-compression piston 311 reaches its bottom dead center position, or the timing of its opening and closing may change in response to engine torque settings. Valve 317 remains closed.

Crankshaft section 319 continues to rotate from the bottom dead center position toward head 312 (up in FIG. 6) so that piston rod 313 pushes first pre-compression piston 311 toward the head to compress the air.

Outlet valve 317, which may be a reed valve or a controlled valve, opens when the pressure in first pre-compression chamber 318 is equal to the pressure in first accumulator 304. The compressed air flows past open valve 317 through duct 316 into the accumulator.

The air next flows from first accumulator 304 into first heat exchanger 306. A dividing plate 380 separates accumulator tank 382 into separate accumulators, first accumulator 304 and second accumulator 384. The compressed air flows through passage 374, which extends between heat exchanger 306 and dividing plate 380 past intake valve 375 into second pre-compression chamber 378. The second pre-compression stage operates similarly to the way in which the first pre-compression stage works. That is, crankshaft 301 rotates crankshaft section 379 so that piston rod 373 reciprocates second pre-compression piston 371 in cylinder 370. When piston 371 moves down away from head 372, it draws air from passage 374 past valve 375. Further rotation of crankshaft section 379 pushes piston 371 toward head 372 to further compress the working fluid. The working fluid is discharged past valve 377 into duct 376 and into second accumulator 384 when the pressure in pre-compression chamber 378 exceeds the pressure in second accumulator 384. Valves 375 and 377 are similar in operation and in related control structure to valves 315 and 317 of the first pre-compression stage, and all of them are similar to the respective valves 15 and 17 of the single pre-compression stage in the FIG. 3 embodiment.

The high pressure working fluid them passes through heat exchanger 386 where it can then flow to combustion chambers 328 and 338. Heat exchanger 386 is shown in the exemplary embodiment as a recuperator. The recuperator has a low pressure, hot fluid bypass valve 387, which controls the temperature of the high pressure working fluid from second accumulator 384 into combustion chamber 328 and 338. Valve 387 controls the amount of exhaust gas that flows through the other side of heat exchanger 386. By varying the position of valve 387, one can control whether the exhaust gases flow through heat exchanger 386 or bypass the heat exchanger as the gases flow from combustion chamber 348 past valve 347 into duct 346 and out exhaust 390.

Because of the ability to control the temperature of the working fluid that enters combustion chambers 328 and 338, the temperature can be sufficiently elevated so that further compression that the working fluid undergoes in the combustion chambers raises the working fluid temperatures to the point where compression ignition of the fuel will take place.

The ability to control the temperature allows the use of a wider range of possible fuels in this embodiment of the invention.

From the foregoing it should be apparent that the multi-staged engine of the pressure invention has the following advantages:

(1) Both the spark ignition and compression ignition versions of the multi-staged internal combustion engine are more efficient than existing internal combustion engines;

(2) Both the spark ignition and compression ignition versions of the multi-staged internal combustion engine can use a much wider range of fuels than can comparable existing engines;

(3) Both the spark ignition and compression ignition versions of the multi-staged internal combustion engine are smaller, lighter and warm up faster than comparable existing engines;

(4) The multi-staged spark ignition internal combustion engine has part load efficienices that are a much higher percentage of full load efficiency than do comparable present engines;

(5) The multi-staged spark ignition internal combustion engine produces much less pollution than do comparable present engines;

(6) The multi-staged spark ignition internal combustion engine varies torque of the engine over a very wide range of values much more efficiently than do comparable present engines which can make the transmission simpler and lighter and makes the vehicle easier to drive; and (7) The multi-staged spark ignition internal combustion engine requires less energy to start than do comparable present engines so the batteries, starters, generators, wiring, etc. can be reduced in size and weight.

Because numerous modifications and alternate embodiments will occur to those skilled in the art, it is intended that the invention be limited only in terms of the appended claims.

I claim:

1. A multi-staged internal combustion engine, comprising:
    means for compressing a working fluid;
    accumulator means connected to the compressing means for receiving and storing the compressed working fluid;
    means for cooling the compressed working fluid of the accumulator means;
    means for receiving the cooled working fluid from the accumulator means, further compressing the working fluid, and combusting the working fluid to drive the engine; and
    means for utilizing exhaust from the combusting means to drive the engine through expansion of the exhaust.

2. An engine as set forth in claim 1, wherein the means for utilizing exhaust from the combusting means to drive the engine through expansion of the exhaust, drive the means for compressing the working fluid.

3. An engine as set forth in claim 1, including drive means mounted for rotation in the engine, and wherein the means for compressing a working fluid includes a pre-compression cylinder and a pre-compression piston in the pre-compression cylinder, and connecting means between the pre-compression cylinder and the driven means, wherein the pre-compression cylinder receives the working fluid which is compressed therein by the pre-compression piston.

4. An engine as set forth in claim 3, wherein the means for utilizing exhaust from the combustion means to drive the engine through expansion of the exhaust, includes a post-expansion cylinder and a post-expansion piston in the post-expansion cylinder, and means for attaching the post-expansion piston to the driven means, the post-expansion cylinder receiving combustion products at elevated pressure from the combusting means, wherein the pressure of the combustion products pushes the post-expansion piston to drive the driven means.

5. An engine as set forth in claim 1, including driven means mounted for rotation in the engine, and wherein the combusting means includes combustion chamber means including a combustion chamber and a combustion piston in the combustion chamber, and rod connecting means between the combustion piston and the driven means, wherein the combustion piston compresses the working fluid which is then ignited to create combustion products which expand to drive the combustion piston and thereby drive the driven means.

6. An engine as set forth in claim 5, wherein the means for compressing the working fluid includes a pre-compression cylinder and a pre-compression piston in the pre-compression cylinder, and wherein the means for utilizing exhaust from the combusting means to drive the engine through expansion of the exhaust includes a post-expansion cylinder and a post-expansion piston in the post-expansion cylinder, wherein the pre-compression cylinder and the post-expansion cylinder are co-axial and form a dual cylinder, the pre-compression piston comprising one side of a dual piston within the dual cylinder, the post-expansion piston comprising the other side of the dual piston within the dual cylinder.

7. An engine as set forth in claim 6, including two combustion chambers, wherein each combustion chamber is located on opposite sides of the dual cylinder with respect to the other.

8. An engine as set forth in claim 1, wherein the working fluid is a fuel/air mixture.

9. A multi-staged internal combustion engine comprising:
    driven means mounted for rotation in the engine;
    pre-compression means including a pre-compression cylinder and a pre-compression piston in the pre-compression cylinder, piston connecting means between the pre-compression piston and the driven means, the pre-compression cylinder receiving a fuel/air mixture and compressing the fuel/air mixture;
    accumulator means connected to the pre-compression cylinder for receiving the compressed fuel/air mixture;
    heat exchanger means for cooling the fuel/air mixture of the accumulator means;
    combustion means including combustion chamber means and a combustion piston in the combustion chamber means, rod connecting means between the combustion piston and the driven means, the combustion chamber means being connected to the heat exchanger means for receiving the fuel/air mixture, the combustion piston compressing the fuel/air mixture which is then ignited to create combustion products which expand to drive the combustion piston and thereby rotate the driven means; and
    post-expansion means including a post-expansion cylinder and a post-expansion piston in the post expansion cylinder, and means for attaching the post-expansion piston to the driven means, the post-expansion cylinder receiving combustion products at elevated pressure from the combustion chamber means, wherein the pressure of the combustion products pushes the post-expansion piston to drive the driven means.

10. An engine as set forth in claim 9, wherein the surface area of a combustion piston is a small fraction of the surface area of the post-expansion piston.

11. An engine as set forth in claim 9, further comprising an intake valve between the heat exchanger means and the combustion chamber means, an outlet valve between the combustion chamber means and the post-expansion cylinder, and a first cam means operably connected to the driven means for opening the outlet valve during a portion of the movement of the combustion piston.

12. An engine as set forth in claim 11, further comprising a post-expansion valve in the post-expansion cylinder alternatively closing and opening the post-expansion cylinder to the exhaust, and a second cam means operably connected to the post-expansion valve for opening the post-expansion valve means during a portion of the movement of the post-expansion piston.

13. An engine as set forth in claim 9, further comprising an intake valve between the heat exchanger means and the combustion chamber means, an outlet valve between the combustion chamber means and the post-expansion cylinder, and first cam means operably connected to the driven means, the amount of the fuel/air mixture flowing from the heat exchanger means into the combustion chamber means adding to any combustion products in the combustion chamber means so that the total amount of the fuel/air mixture and the combustion products exceeds the displacement that the combustion piston means would normally produce in the combustion chamber means.

14. An engine as set forth in claim 9, wherein the pre-compression cylinder and the post-expansion cylinder are co-axial and form a dual cylinder, the pre-compression piston comprising one side of a dual piston within the dual cylinder, the post-expansion piston comprising the other side of the dual piston within the dual cylinder.

15. An engine as set forth in claim 14, wherein the combustion chamber means comprises a pair of combustion chambers, each combustion chamber being on opposite sides of the dual cylinder, wherein the piston in the dual cylinder moves in the opposite direction to the pistons in the combustion chambers.

16. An engine as set forth in claim 15, wherein the fuel/air mixture in each of the combustion chambers is ignited during every 720° of rotation of the driven means, each combustion piston being 360° out-of-phase with each other.

17. An engine as set forth in claim 9, further comprising a duct extending between the combustion chamber means and the post-expansion cylinder through which gas can flow, outlet valve means closing the duct to prevent flow between the combustion chamber means and the post-expansion cylinder, and valve cam means for opening the outlet valve, the outlet valve having a pressure balancing surface responding to the pressure in the duct to compensate for pressure on other parts of the outlet valve tending to open the outlet valve.

18. An engine as set forth in claim 9, further comprising a duct extending between the combustion chamber means and the post-expansion cylinder through which gas can flow, outlet valve means closing the duct to prevent flow between the combustion chamber means and the post-expansion cylinder, and valve cam means for opening the outlet valve, the driven means driving the combustion piston through a first of two movements to exhaust combustion products into the duct, the valve cam means closing the outlet valve during the second of the two movements of the combustion piston to recompress combustion products to approximately the pressure of the fuel/air mixture in the accumulator means.

19. An engine as set forth in claim 18, further comprising an exhaust duct exhausting the combustion products from the post-expansion means, post-expansion outlet valve means closing the exhaust duct to prevent flow from the post-expansion means, and an exhaust valve cam means for opening the post-expansion outlet valve at each engine rotation, the exhaust valve cam means closing the post-expansion outlet valve to permit recompression of the combustion products within the post-expansion means to approximately the pressure of the combustion products in the combustion chamber at the time the outlet valve means between the combustion chamber and post-expansion means opens.

20. An engine as set forth in claim 9, further comprising:
fuel/air mixing means;
intake means between the fuel/air mixing means and the pre-compression cylinder for conveying the fuel/air mixture from the fuel/air mixing means to the pre-compression cylinder; and
intake valve means between the intake means and the pre-compression cylinder, the intake valve means alternating between a blocking condition for blocking fuel/air mixture from flowing from the intake means to the pre-compression cylinder and an open condition permitting the fuel/air mixture to flow from the intake means to the pre-compression cylinder.

21. An engine as set forth in claim 20, further comprising pre-compressor exit valve means between the pre-compression cylinder and the accumulator means for alternately blocking the fuel/air mixture from flowing from the pre-compression cylinder to the accumulator means and permitting the fuel/air mixture to flow from the pre-compression cylinder to the accumulator means, wherein the exit valve means is a flexure-close off valve for causing the fuel/air mixture to flow into the accumulator means only when the pressure in the pre-compression cylinder exceeds the pressure in the accumulator means.

22. An engine as set forth in claim 20, wherein the intake valve means is a flexure-close off valve.

23. An engine as set forth in claim 9, further comprising:
fuel/air mixing means connected to the pre-compression cylinder;
intake means between the fuel/air mixing means and the pre-compression cylinder for conveying fuel/air mixture from the fuel/air mixing means to the pre-compression cylinder;
intake valve means between the intake means and the pre-compression cylinder for alternately blocking fuel/air mixture from flowing from the intake means to the pre-compression cylinder and permitting the fuel/air mixture to flow from the intake means to the pre-compression cylinder; and
adjustable cam means and follower means extending between the adjustable cam means and the intake valve means for adjusting the timing that the intake valve means is in its open condition, wherein the adjustable cam means is connected to an accelerator means to adjust the timing that the intake valve means is in the open condition in response to changes in the setting of the accelerator means.

24. A multi-staged internal combustion engine, comprising:
means for compressing a working fluid, including a pre-compression cylinder and a pre-compression piston in the pre-compression cylinder;
means for cooling the working fluid which has exited the compressing means;
combustion chamber means for receiving working fluid previously conditioned by the compressing means and cooling means, further compressing the working fluid, and combusting the working fluid to drive the engine;
means for utilizing exhaust from the combustion chamber means to drive the engine through expansion of the exhaust, including a post-expansion cylinder and a post-expansion piston in the post-expansion cylinder, wherein the pre-compression cylinder and the post-expansion cylinder are co-axial and form a dual cylinder, the pre-compression piston comprising one side of a dual piston within the dual cylinder, the post-expansion piston comprising the other side of the dual piston within the dual cylinder; and
driven means mounted for rotation in the engine, wherein the combustion chamber means includes a combustion chamber and a combustion piston in the combustion chamber, and rod connecting means between the combustion piston and the driven means, wherein the combustion piston compresses the working fluid which is then ignited to create combustion products which expand to drive the combustion piston and thereby drive the driven means.

25. An engine as set forth in claim 24, including two combustion chambers, wherein each combustion chamber is located on opposite sides of the dual cylinder with respect to the other.

26. An internal combustion engine, comprising:
a pre-compression cylinder including a pre-compression cylinder head and having a pre-compression piston therein;
drive means connected to the pre-compression piston for reciprocating the pre-compression piston between movement toward and away from the pre-compression cylinder head, the pre-compression cylinder receiving a fuel/air mixture during the movement of the pre-compression piston away from pre-compression cylinder head, the pre-compression piston compressing the fuel/air mixture;
an accumulator connected to the pre-compression cylinder and receiving the compressed fuel/air mixture from the pre-compression cylinder;
a heat exchanger attached to the accumulator for cooling the fuel/air mixture from the accumulator;
a plurality of combustion chambers each including a combustion chamber head, and a combustion piston in each combustion chamber connected to the drive means, each combustion piston reciprocating between movement toward and away from the respective combustion chamber head, each combustion chamber being connected to the heat exchanger for receiving the fuel/air mixture during a movement of the respective combustion piston away from the combustion chamber head, the combustion piston compression the fuel/air mixture which is subsequently ignited to create combustion products which expand to drive the combustion piston from the combustion chamber head to drive the drive means; and
a post-expansion cylinder, and a post-expansion piston connected to the drive means and positioned for reciprocating movement within the post-expansion cylinder, wherein the post-expansion cylinder receives exhaust gases from the combustion chambers to drive the drive means.

27. An internal combustion engine, comprising:
at least two combustion chambers each having a combustion piston reciprocating toward and away from a closed off end;
drive means in the engine and connecting means between the combustion pistons and the drive means for converting reciprocating motion of the pistons into rotary motion of the drive means;
a pre-compression piston mounted for reciprocation in a pre-compression cylinder, the pre-compression cylinder having a closed head end, second connecting means between the pre-compression piston and the drive means for reciprocating the pre-compression piston in the pre-compression cylinder whereby the piston draws a fuel/air mixture into the pre-compression cylinder when the pre-compression piston moves away from the head and compresses the fuel/air mixture when it moves toward the head;
a heat exchanger connected by passage means to the pre-compression cylinder for cooling the fuel/air mixture;
intake duct means extending from the heat exchanger to the combustion chambers;
a post-expansion piston mounted for reciprocation in a post-expansion cylinder, third connecting means for connecting the post-expansion piston to the drive means for reciprocating the post-expansion piston 180° out-of-phase with the combustion pistons;
post-expansion duct means connecting the combustion chambers with the post-expansion cylinder; and
outlet valve means for each combustion chamber in the post-expansion duct means for alternatively closing or opening the post-expansion duct means and, control means for opening the outlet valve means when the combustion products are still expanding in the combustion chamber so that some of the expansion of the combustion products takes place in the post-expansion cylinder to move the post-expansion piston against its connecting means to drive the drive means.

28. An internal combustion engine as set forth in claim 27, wherein there are two combustion chambers, each combustion chamber being located on opposite sides of the post-expansion chamber.

29. An internal combustion engine as set forth in claim 27, wherein the pre-compression cylinder and the post-expansion cylinder are co-axial and form a dual cylinder, the pre-compression piston comprising one side of a dual piston within the dual cylinder, the post expansion piston comprising the other side of the dual piston within the dual cylinder.

30. A multi-stage internal combustion engine, comprising:
combustion chamber means including at least two combustion chambers each having a combustion piston reciprocating within a respective combustion cylinder, wherein fuel is injected into the combustion chambers;
drive means in the engine connected to the combustion pistons for converting reciprocating motion of the pistons into rotary motion of the drive means;
first pre-compression means driven by the drive means for compressing air prior to its being drawn into the combustion chamber means;
first accumulator means connected to the first pre-compression means by first duct means, the first accumulator means storing compressed air at an elevated pressure;
first heat exchanger means for cooling the air exiting the first accumulator means;
second pre-compression means connected by second pre-compression intake means to the first accumulator means, the second pre-compression means being driven by the drive means for further compressing the air;
second accumulator means connected by second duct means to the second pre-compression means, the second accumulator means storing the further compressed air at an elevated pressure;
second heat exchanger means connected by second passage means to the second accumulator means, the second heat exchanger means heating the air;
intake duct means extending from the second heat exchanger means to the combustion chamber means for introducing the further compressed air into the combustion chambers; and post-expansion means connected by post-expansion duct means to the combustion chamber means, the post expansion means utilizing exhaust from the combustion chamber means to drive the drive means through expansion of the exhaust;

wherein the exhaust from the post-expansion means provides means for heating the air of the second heat exchanger means.

31. An engine as set forth in claim 30, including adjustable valve means for controlling the flow of exhaust from the post-expansion means through the second heat exchanger means.

32. A method of operation of an internal combustion engine, the steps comprising:
compressing a working fluid;
temporarily storing the working fluid that was compressed;
cooling the temporarily stored, compressed working fluid;
further compressing the working fluid within a combustion chamber, igniting the further compressed working fluid and expanding the products of combustion against a piston in the combustion chamber to drive the engine; and
transferring a portion of the expanding combustion products to a post-expansion cylinder to expand against a post-expansion piston in the post-expansion cylinder to further drive the engine.

33. The method of claim 32, including the step of recompressing some of the products of combustion in the post-expansion chamber to a pressure approximately equal to the pressure in the combustion chamber before causing combustion products to flow from the combustion chamber to the post-expansion chamber to minimize the initial flow from the combustion chamber to the post-expansion chamber.

34. The method of claim 32, including the step of controlling the amount of working fluid entering the pre-compression cylinder to control the output of the engine.

35. The method of claim 32, wherein the working fluid is compressed in at least two stages prior to further compression within the combustion chamber, and wherein the working fluid is cooled following each stage of compression.

36. The method of claim 32, wherein the initial step of compressing the working fluid is directly effected through expansion of combustion products against the post-expansion piston.

37. A multi-staged internal combustion engine, comprising:
means for compressing a working fluid;
means for cooling the working fluid which has exited the compressing means;
accumulator means connected to the compressing means for receiving and storing the compressed working fluid prior to its being conditioned by the cooling means;
combustion chamber means for receiving working fluid previously conditioned by the compressing means and cooling means, further compressing the working fluid, and combusting the working fluid to drive the engine, wherein the combustion chamber means includes a plurality of combustion chambers each including a combustion chamber head, and a combustion piston in each combustion chamber connected to engine drive output means, each combustion piston reciprocating between movement toward and away from the respective combustion chamber head, each combustion chamber being fluidly connected with the cooling means for receiving the working fluid during a movement of the respective combustion piston away from the combustion chamber head, the combustion piston compressing the working fluid which is subsequently ignited to create combustion products which expand to drive the combustion piston from the combustion chamber head to drive the engine drive output means; and
means for utilizing exhaust from the combustion chamber means to drive the engine through expansion of the exhaust.

38. A multi-staged internal combustion engine, comprising:
means for compressing a working fluid;
means for cooling the working fluid which has exited the compressing means;
combustion chamber means for receiving working fluid previously conditioned by the compressing means and cooling means, further compressing the working fluid, and combusting the working fluid to drive the engine, including a plurality of combustion chambers each including a combustion chamber head, and a combustion piston in each combustion chamber connected to engine drive output means, each combustion piston reciprocating between movement toward and away from the respective combustion chamber head, each combustion chamber being fluidly connected with the cooling means for receiving the working fluid during a movement of the respective combustion piston away from the combustion chamber head, the combustion piston compressing the working fluid which is subsequently ignited to create combustion products which expand to drive the combustion piston from the combustion chamber head to drive the engine drive output means; and
means for utilizing exhaust from the combustion chamber means to drive the engine through expansion of the exhaust;
wherein the compressing means includes a pre-compression cylinder and a pre-compression piston positioned for reciprocating movement therein, wherein the means for utilizing exhaust from the combustion chamber means to drive the engine through expansion of the exhaust includes a post-expansion cylinder, a post-expansion piston connected to the drive means and positioned for reciprocating movement within the post-expansion cylinder, wherein the post-expansion cylinder receives exhaust gasses from the combustion chambers to drive the engine drive output means, and wherein the working fluid in each of the combustion chambers is ignited every 720 degrees of rotation of the engine drive output means, each combustion piston being 360 degrees out-of-phase with the other.

39. A multi-staged internal combustion engine, comprising:
means for compressing a working fluid, including a pre-compression cylinder and a pre-compression piston in the pre-compression cylinder;
means for cooling the working fluid which has exited the compressing means;

combustion chamber means for receiving working fluid previously conditioned by the compressing means and cooling means, and raising the temperature of the working fluid by means of combustion to drive the engine, wherein the combustion chamber means comprises two cylinders which undergo successively an intake, a compression, a combustion, an expansion and an exhaust in 720 degrees of engine rotation; and means for utilizing exhaust from the combustion chamber means to drive the engine through expansion of the exhaust, including a post-expansion cylinder and a post-expansion piston in the post-expansion cylinder, wherein the pre-compression cylinder and the post-expansion cylinder are co-axial and form a dual cylinder, the pre-compression piston comprising one side of a dual piston within the dual cylinder, the post-expansion piston comprising the other side of the dual piston within the dual cylinder.

40. An engine as set forth in claim 39, including two combustion chambers, wherein each combustion chamber is located on an opposite side of the dual cylinder with respect to the other, and wherein the working fluid in each of the combustion chambers is ignited every 720 degrees of engine rotation, each combustion piston being 360 degrees out-of-phase with the other.

41. An engine as set forth in claim 39, including accumulator means connected between the compression means and the combustion cylinders for receiving and storing compressed working fluid.

42. A multi-staged internal combustion engine, comprising:

driven means mounted for rotation in the engine;

pre-compression means including a pre-compression cylinder and a pre-compression piston in the pre-compression cylinder, piston connecting means between the pre-compression piston and the driven means, the pre-compression cylinder receiving a fuel/air mixture and compressing the fuel/air mixture;

heat exchanger means for cooling the compressed fuel/air mixture;

accumulator means connected to the pre-compression cylinder for receiving the compressed fuel/air mixture;

combustion means including combustion chamber means and a combustion piston in the combustion chamber means, rod connecting means between the combustion piston and the driven means, the combustion chamber means being connected to the accumulator means for receiving the fuel/air mixture, the combustion piston compressing the fuel/air mixture which is then ignited to create combustion products which expand to drive the combustion piston and thereby rotate the driven means; and post-expansion means including a post-expansion cylinder and a post-expansion piston in the post expansion cylinder, and means for attaching the post-expansion piston to the driven means, the post-expansion cylinder receiving combustion products at elevated pressure from the combustion chamber means, wherein the pressure of the combustion products pushes the post-expansion piston to drive the driven means.

* * * * *

UNITED STATES PATENT AND TRADEMARK OFFICE
CERTIFICATE OF CORRECTION

PATENT NO. : 4,783,966

DATED : November 15, 1988

INVENTOR(S) : Clare A. Aldrich

It is certified that error appears in the above-identified patent and that said Letters Patent is hereby corrected as shown below:

In Column 1, line 43, insert "." between the words "altitude" and "Multi-staging."

In Column 1, line 60, delete the word "the."

In Column 4, line 50, delete the word "acumulators" and insert therefor --accumulators--.

In Column 4, line 60, delete the word "heaters" and insert therefor --headers--.

In Column 5, line 32, delete the word "were" and insert therefor --where--.

In Column 5, line 60, delete the word "multi-stage" and insert therefor --multi-staged--.

In Column 5, line 64, delete the word "multi-stage" and insert therefor --multi-staged--.

In Column 7, line 62, delete the word "can" and insert therefor --cam--.

UNITED STATES PATENT AND TRADEMARK OFFICE
CERTIFICATE OF CORRECTION

PATENT NO. : 4,783,966
DATED : November 15, 1988
INVENTOR(S) : Clare A. Aldrich

It is certified that error appears in the above-identified patent and that said Letters Patent is hereby corrected as shown below:

In Column 9, line 39, delete the word "chamber" and insert therefor --chambers--.

In Column 11, line 12, delete the word "recompress" and insert therefor --re-compress--.

In Column 12, line 24, delete the word "Becuase" and insert therefor --Because--.

In Column 14, line 10, delete the word "seated" and insert therefor --sealed--.

In Column 16, line 23, delete the word "atmosphere" and insert therefor --atmospheric--.

In Column 17, line 15, delete the word "cam" and insert therefor --can--.

In Column 18, line 9, delete the word "them" and insert therefor --then--.

In Column 19, line 22, delete the word "drive" and insert therefor --drives--.

UNITED STATES PATENT AND TRADEMARK OFFICE
CERTIFICATE OF CORRECTION

PATENT NO. : 4,783,966

DATED : November 15, 1988

INVENTOR(S) : Clare A. Aldrich

It is certified that error appears in the above-identified patent and that said Letters Patent is hereby corrected as shown below:

In Column 19, line 23, delete the word "drive" and insert therefor --driven--.

In Column 19, line 34, delete the word "combustion" and insert therefor --combusting--.

In Column 24, line 16, delete the word "alternatively" and insert therefor --alternately--.

In Column 27, line 30, delete the word "compression" and insert therefor --compressing--.

Signed and Sealed this

Second Day of May, 1989

Attest:

DONALD J. QUIGG

*Attesting Officer*    *Commissioner of Patents and Trademarks*